United States Patent Office 3,151,999
Patented Oct. 6, 1964

3,151,999
METAL PROTECTIVE PIGMENT
Joseph A. Orsino, Mountain Lakes, N.J., and Edward J. Dunn, Jr., Port Washington, N.Y., assignors to National Lead Company, New York, N.Y., a corporation of New Jersey
No Drawing. Filed Apr. 5, 1960, Ser. No. 20,022
4 Claims. (Cl. 106—297)

This invention relates to a novel metal protective pigment. In particular, this invention relates to a novel composite metal protective pigment containing as active ingredient therein calcium plumbate, $2CaO.PbO_2$.

Numerous pigments have been developed and used for the protection of metal surfaces against corrosion. Usually, these pigments are embodied in primer coats, which are subsequently covered by finished coats for decorative purposes. Among such metal protective pigments are red lead, zinc chromate, basic lead silico chromate and others. Generally, these protective pigments are highly colored materials. Such colored pigments are unsuitable for use in a finished coat except where the distinctive red or orange color happens to be the color desired for decorative purposes.

In the application of any protective coating, a problem is guarding against occasional "holidays" or discontinuity in the applied coating, leaving the surface to be protected exposed to the corrosive environment. This difficulty is conventionally minimized by the application of 2 coats or more of the protective finish and/or by employing such devices as electrical holiday detectors. Where multiple coats of protective film are applied, they must still be covered generally by a finished coat of the desired color. Also, the application of a second coat of protective pigment identical with the first entails some inconvenience particularly on large jobs in that it is difficult to observe where the second coat has been applied and where it has yet to be applied.

An object of this invention therefore is to provide an improved metal protective pigment. Another object is to provide a metal protective pigment suitable for use in finish coats as well as in primers. Still another object is to provide a metal protective pigment having a color markedly different from other metal protective pigments so that a second coat of the novel pigment over a first coat of a conventional protective paint will show instantaneously where the second coat has and has not been applied. Another object still is to provide a metal protective pigment suitable for use in a single coat application combining the functions of corrosion resistance and decorative effects. Other objects and advantages will become apparent from the following more complete description and claims.

Broadly, this invention contemplates a composite pigment particle comprising a silica core and a coating of calcium plumbate. This invention also contemplates a metal protective finish consisting essentially of a dispersion in an oleoresinous vehicle of pigment particles, said particles comprising a silica core and a coating of calcium plumbate.

Calcium plumbate, $2CaO.PbO_2$, has previously been suggested for use as a metal protective pigment. It has the advantage of being white or light in color and thus suitable for use in a finish coat either in its own natural color or tinted to produce light color tints. Calcium plumbate as such, however, has not achieved wide usage, partly at least because of its cost. It has now been found that this disadvantage can be overcome by more efficient utilization of the active ingredient through the means of applying it as a coating to an inert silica core. In a pigment consisting entirely of calcium plumbate particles, only the surface of each particle is utilized, the core of the particle contributing little or nothing to the protective quality of the film. When the core of the metal protective pigment particle is replaced, according to this invention, with an inert core of silica, the resulting pigment is lighter in weight and less costly to produce, while still retaining the active anticorrosive properties of the calcium plumbate surface. Paints made in conventional manner by grinding the pigment of this invention into a suitable vehicle may be applied directly to freshly galvanized steel, or may be applied as a second coat over a coating of the same or a different metal protective pigment or the like. If desired, a finish coat may be applied over the coat containing the protective pigment of this invention, although in the ordinary case it will be preferred to incorporate tinting materials if desired and allow the paint containing the protective pigment of this invention to function also as the finish coat. The pigments of this invention and paints made therefrom may even, if desired, be made the basis of a one coat application, the single coat serving both the function of a metal protective coat and a finish coat.

The pigment of this invention may conveniently be prepared by starting with unground silica, litharge and calcium oxide, adding them to water in a suitable vessel and transferring the resulting slurry to a ball mill, after grinding, filtering, drying and calcining. The calcination temperature should be at least about 550° C. to insure reaction between the litharge and lime. On the other hand calcination temperatures exceeding 750° C. are undesirable because a fused type of product is formed making grinding difficult. Generally, a calcination temperature in the neighborhood of 600 to 700° C. is preferred.

The ratio of lime to litharge should be approximately stoichiometrical to produce the compound $2CaO.PbO_2$. A moderate excess, say 10% of either litharge or lime may be present. If excessive amounts of free lime are present however, the resulting pigment is excessively alkaline, which is undesirable because it reduces the weathering resistant properties of the paint. On the other hand, although not as damaging, excessive amounts of free litharge are also undesirable because of the reactive nature of this material which tends to cause an imbalance in the product and reduces the efficiency of the pigment. The proportion of silica present is not critical and may be varied within relatively wide limits. Amounts of silica less than about 25% of the composition, however, are generally insufficient to provide any appreciable improvement in the efficiency of utilization of the active components. Amounts of silica exceeding 75%, on the other hand, dilute the active ingredients to such an extent that the efficiency of utilization thereof is actually diminished. Within this broad range, amounts of silica between about 40 and 60% are ordinarily preferred.

In order to more fully illustrate the nature of this invention and the manner of practicing the same the following example is presented.

EXAMPLE

Unground silica, 1133 grams, colormakers grade litharge, 773 grams, and technical grade calcium oxide, 362 grams were placed in a ball mill to which was added 1800 ml. of water, and then stirred. This slurry was milled for 24 hours, filtered, dried at 115° C. and calcined at 650° C. for 4 hours. The calcined product was passed through a Raymond mill using a 0.02 inch mesh screen in order to break up any agglomerates. The resulting pigment was a fine powder of almost white color. This powder was incorporated into a paint according to the following formulation.

The calcium plumbate coated silica pigment was found to possess good rust inhibitive and blistering resistance properties. The pigment was compared to calcium plumbate and a mechanical mixture of calcium plumbate and silica. The following examples of paint formulations, found in Table I, were applied to clean sandblasted steel panels and rusted steel panels.

Table I
FORMULATIONS OF METAL PROTECTIVE PAINTS

|  | Control 1 | Control 2 | Test 1 |
|---|---|---|---|
| Percent pigment | 69.2 | 62.2 | 59.0 |
| Calcium plumbate, lbs./100 gal | 99.4 | 49.5 | |
| Ground quartz, lbs./100 gal | | 49.5 | |
| Calcium plumbate coated silica, lbs./100 gal | | | 99.0 |
| Bentone 34, lbs./100 gal | 0.6 | 1.0 | 1.0 |
| Percent vehicle | 30.8 | 37.8 | 41.0 |
| #555 P.H.B. linseed oil, lbs./100 gal | 16.5 | 19.4 | 17.1 |
| Raw linseed oil, lbs./100 gal | 47.7 | 56.3 | 49.6 |
| Solvents and driers, lbs./100 gal | 35.8 | 24.3 | 33.3 |

Bentone 34 is an organophilic bentonite prepared by the reaction of bentonite with an aliphatic quaternary ammonium salt. #555 P.H.B. linseed oil is a pale heat bodied linseed oil with a $Z_2$ viscosity.

Table II shows the results found following eleven months atmospheric exposure on sandblasted steel panels. One and two coats of primer paint were applied comparing the control paints and the test paint in linseed oil vehicle.

Table II
ATMOSPHERIC CORROSION RESISTANCE—11 MONTHS EXPOSURE

| Paint | Pigment | 1 coat Corrosion Rating | 2 coats Corrosion Rating |
|---|---|---|---|
| Control 1 | Calcium plumbate | 3 | 7 |
| Control 2 | Calcium plumbate and silica | 3 | |
| Test 1 | Calcium plumbate coated silica | 6 | 10 |

The corrosion resistance test and numerical ratings, found in Table II, are based on physical appearance. A rating of 10 is perfect and 0 for complete failure.

A one coat application of test paint 1 was superior to both controls, rating of 6 as against 3 and 3. In a two coat application, test paint 1 had a perfect rating of 10 as compared to a rating of 7 for calcium plumbate.

The same paints were exposed to the atmosphere on rusted steel panels. Table III shows the results.

Table III
ATMOSPHERIC CORROSION RESISTANCE—11 MONTHS EXPOSURE. RUSTED PANELS

| Paint | Pigment | 1 coat Corrosion Rating | 2 coats Corrosion Rating |
|---|---|---|---|
| Control 1 | Calcium plumbate | 2 | 4 |
| Control 2 | Calcium plumbate and silica | 3 | 8 |
| Test 1 | Calcium plumbate coated silica | 5 | 9 |

The calcium plumbate coated silica was superior, on corrosion resistance, to the controls in both 1 coat and 2 coat applications.

The same group of control and test pigments were evaluated in alkyd vehicles. Table IV reveals the metal protective paint formulations.

Table IV
FORMULATIONS OF METAL PROTECTIVE PAINTS

|  | Control 3 | Control 4 | Test 2 |
|---|---|---|---|
| Percent Pigment | 57.0 | 46.2 | 44.4 |
| Calcium plumbate, lbs./100 gal | 99.1 | 49.3 | |
| Ground quartz, lbs./100 gal | | 49.3 | |
| Calcium plumbate coated silica, lbs./100 gal | | | 98.5 |
| Bentone 34, lbs./100 gal | 0.9 | 1.4 | 1.5 |
| Percent Vehicle | 43.0 | 53.8 | 55.6 |
| Alkyd Resin Solution 2458, lbs./100 gal | 77.4 | 80.6 | 76.9 |
| Solvents and driers, lbs./100 gal | 22.6 | 19.4 | 23.1 |

The alkyd resin used was a medium oil length alkyd resin solution comprising 50% non-volatile solids. The solids show approximately 32% phthalic anhydride, 49% fatty acids and the remaining 19% polyhydroxy alcohols and modifiers.

Table V shows the results found after an atmospheric exposure of 11 months on sandblasted steel panels using two coats of primer 1.5 mil. dry film thickness per coat.

Table V
ATMOSPHERIC CORROSION RESISTANCE—11 MONTHS EXPOSURE

| Paint | Pigment | 2 coats corrosion rating |
|---|---|---|
| Control 3 | Calcium plumbate | 2 |
| Control 4 | Calcium plumbate and silica | 5 |
| Test 2 | Calcium plumbate coated silica | 8 |

After 11 months exposure, the test paint was decidedly superior as compared to the control paints; rating of 8 as against 2 and 5.

Table VI lists the results of the half tide blistering resistance of the calcium plumbate coated silica pigment, using calcium plumbate and a mechanical mixture of calcium plumbate and silica as controls. The following painting system was used on sandblasted hot rolled steel panels; 2 coats primer over all, finish coat over all. The finished coat used on all panels was a gray paint meeting the requirements of U.S. Government Specification MIL-P-15130A in an alkyd vehicle. All paints were applied at 1.5 mils dry film thickness per coat.

The test was conducted according to a rating of 10 if the panel was free of blistering, and 0 for complete blistering; S designates a blister size of approximately 1/16", M approximately 3/16" and L of larger than 1/4".

Table VI
BLISTERING RESISTANCE AT HALF TIDE—10 MONTHS EXPOSURE

| Paint | Pigment | Blister Rating |
|---|---|---|
| Control 3 | Calcium plumbate | 2S. |
| Control 4 | Calcium plumbate and silica | 7M. |
| Test 2 | Calcium plumbate coated silica | 8L. |

Calcium plumbate coated silica pigments were also evaluated in phenolic and vinyl vehicles. The pigments demonstrated good corrosion and blistering resistance after atmospheric, fresh water and half tide exposures.

While this invention has been described by way of certain preferred embodiments and illustrated by specific examples, these are illustrative only, and the invention is not to be construed as limited except as set forth in the appended claims.

We claim:

1. A pigmentary composition consisting essentially of particles of silica coated with cocalcined oxidic compounds of calcium and lead, wherein said silica is present from about 25% to about 75% of the composition.

2. A composite pigment particle consisting essentially of a silica core and a coating of calcium plumbate, wherein said silica core is present from about 25% to about 75% of the pigment particle.

3. A pigmentary composition consisting essentially of particles of silica coated with cocalcined oxide compounds of calcium and lead forming calcium plumbate, said silica, calcium plumbate analytically present with the following ranges: silica 25% to 75%, calcium plumbate 75% to 25%.

4. A paint composition containing pigmentary particles of silica coated with oxidic compounds of calcium and lead, wherein said silica is present from about 25% to about 75% of the pigmentary particle.

References Cited in the file of this patent

UNITED STATES PATENTS 2,406,307    Read _____ Aug. 20, 1946

OTHER REFERENCES

Wesson: Corrosion Technology, Feb. 1960, pages 37 and 38.

Uebele: "Paint Making and Color Grinding" (1913), page 81.